Patented Dec. 29, 1936

2,065,808

UNITED STATES PATENT OFFICE 2,065,808

HYDROXY DIPHENYL SULPHIDE DERIVATIVES

Treat B. Johnson, Bethany, Conn., assignor to Sharp & Dohme, Incorporated, Philadelphia, Pa., a corporation of Maryland No Drawing. Application June 29, 1935, Serial No. 29,099

12 Claims. (Cl. 260—150)

This invention relates to new derivatives of phenolic and ethereal diaryl sulphides, and includes processes for their preparation. It relates more particularly to derivatives of diaryl sulphides which have, in one position para to the sulphur linkage, a phenolic or ethereal substituent, and in the other para position a halogen.

This application is a continuation in part of my prior application Serial No. 468,468, filed July 16, 1930, now Patent No. 2,017,208, dated Oct. 15, 1935.

The phenolic and ethereal compounds prepared according to the present invention have valuable pharmacological and therapeutic properties, and are useful for certain medicinal purposes. They are also valuable as intermediates for the production of other phenolic and ethereal diaryl sulphide derivatives.

The compounds included within the present invention may be represented by the formula $RO-R_1-S-R_2-X$, in which R represents hydrogen or a hydrocarbon radical, $R_1$ and $R_2$ represent aryl groups, which may be the same or different, and X represents halogen. It is to be understood that the RO group and the halogen are in positions para to the sulfur linkages. Not only are diphenyl sulphide derivatives included within the scope of the invention, but also tolyl phenyl sulphide derivatives, xylyl phenyl sulphide derivatives, and other diaryl sulphide derivatives.

These halogen derivatives are useful not only because of their pharmacological and therapeutic properties, but also as intermediates for the production of other useful phenolic and ethereal compounds. For example, various alcohol, ketone, aldehyde and other aliphatic derivatives may be readily produced by reacting the halides with magnesium to produce reactive compounds of the Grignard reagent type. The halides also serve as intermediates in the production of cyanates, ureides, urethanes, and corresponding thiocompounds.

An advantageous method of producing the phenolic and ethereal derivatives is as follows: An ethereal derivative of a thiophenate is coupled with a halide of a nitrobenzene to produce an alcoxy-nitro-diaryl sulphide, and this is reduced to the corresponding amine. The amine is then diazotized, and the diazonium group replaced by a halogen, to give the etheheal halogen diaryl sulphide. This ether may then be dealkylated to give the phenolic derivative, preferably by the method described in my Patent No. 1,976,732, granted October 16, 1934.

The following examples illustrate the use of this method for the production of 4-methoxy-4'-iodo-diphenyl sulphide and 4-hydroxy-4'-diphenyl sulphide, but it is to be understood that these are given by way of illustration, and that other similar compounds can be similarly produced.

*Example I.—4-methoxy-4'-iodo-diphenyl sulphide*

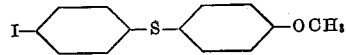

35 parts of para-methoxy-thiophenol are dissolved in 200 parts 95% alcohol and 5.75 parts of metallic sodium are added. This solution of para-methoxy-thiophenate is added to a solution of 40 parts of para-nitrochlorbenzene in 400 parts of 95% alcohol. The mixture assumes a deep red color but after boiling a few minutes this changes to a light orange color and a deposit of salt is formed. The mixture is heated for 4 hours at its boiling point to insure completeness of the reaction. On cooling, a mass of bright yellow crystals separate. The mixture is filtered by suction and an additional quantity of the sulphide is obtained by cautiously diluting the filtrate with water. The product, after thoroughly washing with water to remove adhering salt, has been obtained practically pure in yields of 92% or more of theoretical. The 4-methoxy-4'-nitro-diphenyl sulphide crystallizes from alcohol as bright yellow prisms which melt at 71° C.

62 parts of this nitrosulphide are dissolved in 600 parts of alcohol and reduced with 160 parts of stannous chloride and 170 parts of hydrochloric acid. The mixture is heated at its boiling point under a reflux condenser for two hours after which the alcohol and most of the hydrochloric acid are removed by distillation under diminishing pressure. From this point two procedures may be used to isolate the reduction product:

(a) The residue from the distillation is dissolved in water and concentrated ammonium hydroxide is added until precipitation is complete. The mixture of tin hydroxides and free amine is filtered as dry as possible by suction, and the amine extracted with several portions of boiling alcohol. The alcohol extracts are combined, filtered, and decolorized with charcoal such as norite. On cooling, the free amine separates in glistening, colorless needles, melting at 96°. By diluting the alcohol solution with water, all the dissolved amine is separated.

(b) Hydrochloric acid is added to the residue from the distillation of the alcohol until the stannic chloride addition product of the amine hydrchloride separates completely. After filtering this as dry as possible by suction it is placed in a large separatory funnel, a quantity of crushed ice is added and the mixture covered with a large volume of ether. Concentrated sodium hydroxide (20% solution) is then added slowly and with shaking until all the solid is dissolved. The clear solution is extracted twice with ether. The extracts combined, dried over sodium sulphate, and the amine precipitated as its hydrochloride by adding an alcoholic solution of hydrogen chloride. A white flocculent precipitate is obtained which crystallizes from hydrochloric acid solution in silky needles, melting with decomposition at 205–207°.

40 parts of the hydrochloride of the amine prepared by either method are dissolved in a mixture of 25 parts of concentrated hydrochloric acid and 500 parts of water by heating. The hydrochloride is obtained in a state of fine division by rapidly cooling and stirring the solution. The thick suspension of fine white needles is cooled to 0° C. and diazotized with a solution containing 11 parts of sodium nitrite. The crystals of the hydrochloride dissolve as the diazotization proceeds, and a greenish brown solution of the diazonium salt is obtained. This is dropped rapidly into a concentrated solution of potassium iodide containing 50 parts of the salt in 100 parts of water. An orange red suspension is formed which changes to a black spongy mass when warmed. When the nitrogen is completely evolved this settles as a dark brown oil. The free iodine formed in the reaction is removed with sodium bisulfite, the solution is cooled, and the product is obtained as a hard brown cake. The yield is 90% of the theoretical. It is most conveniently purified by distilling in vacuo. The fraction boiling at 202–205° (2–3 mm.) crystallizes from methyl alcohol in colorless laminae which melt at about 102°.

*Example II.—4-hydroxy-4'-iodo-diphenyl sulfide*

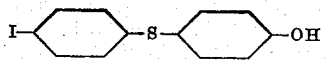

43 parts of the methoxy derivative of Example I are dissolved in a mixture of 85 parts of 48% hydrobromic acid solution and 246.5 parts of acetic acid. After heating the solution in an oil bath under a reflux condenser at 80–85° for ten hours, the hydrobromic acid and most of the acetic acid are removed by distillation under diminished pressure. An excess of 5% sodium hydroxide solution is added to the residue and the mixture heated on the steam bath for an hour to insure hydrolysis of any acetylated phenol that may be formed. After cooling, the mixture is extracted with ether. The extracts are combined and dried over anhydrous sodium sulphate. After removal of the ether, 13.7 parts of unchanged methoxy derivatives are recovered. The alkaline solution is acidified with dilute sulphuric acid and extracted with ether. The extracts are dried and the ether removed. The residue is then distilled in vacuo. The phenol distills as a light brown liquid boiling at 205–210° (3–4 mm.).

The 4-hydroxy-4'-iodo-diphenyl sulfide is extremely soluble in the usual organic solvents. It is most conveniently recrystallized from aqueous methyl alcohol solution from which it separates in glistening white laminae melting at 111–112° C. It readily dissolves in dilute sodium hydroxide solution from which it may be precipitated by saturating the solution with carbon dioxide. It is soluble in boiling water to the extent of about one part in fourteen thousand, but crystallizes out when the solution is cooled, even in dilutions as high as one part in eighty thousand. When warm solutions of the phenol and dilute alcohol are cooled, the desired compound separates in a crystalline form. In 5% alcohol it crystallizes from dilutions as high as one part in sixty thousand, but in 20% alcohol it is retained in a dilution of one part in eight thousand.

The chlorine and bromine phenols and ethers may be prepared in a similar manner, except that the intermediate diazonium compound is dropped into a warm concentrated solution of cuprous chloride or bromide, or into a solution of hydrochloric or hydrobromic acid in the presence of copper dust.

In this application I claim only those diaryl sulphide derivatives in which one para hydrogen is replaced by an alkoxy or hydroxy group, and the other para hydrogens by a halogen. The intermediate nitro and amino compounds and methods of preparing them are claimed in my application Serial No. 29,100 filed of even date in which are also claimed other phenolic or ethereal diaryl sulphides which have as a para substituent a nitrogen-containing group.

I claim:

1. Compounds of the group consisting of 4-alkoxy-4'halo-diphenyl sulfides and 4-hydroxy-4'-halo-diphenyl sulfides.

2. Compounds of the formula

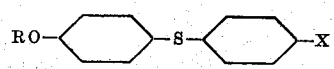

where R is hydrogen or alkyl, and X is halogen.

3. 4-alkoxy-4'-halo-diphenyl sulfides.
4. 4-hydroxy-4'-halo-diphenyl sulfides.
5. 4-methoxy-4'-iodo-diphenyl sulfides.
6. 4-hydroxy-4'-iodo-diphenyl sulfides.
7. 4-methoxy-4'-iodo-diphenyl sulfide.
8. 4-hydroxy-4'-iodo-diphenyl sulfide.

9. The method of preparing compounds of the group consisting of p-alkoxy and p-hydroxy p'-halogen diphenyl sulfides which comprises coupling a para alkyl ether of a thiophenate with para nitro-chlorbenzene, reducing to the amine, diazotizing, and converting the diazonium compound to the halide, with elimination of the diazonium group.

10. The method of producing 4-alkoxy-4'-iodo-diphenyl sulfide which comprises coupling a para alkyl ether of a thiophenate with para nitrochlorbenzene, reducing to the amine, diazotizing, and converting the diazonium compound to the iodide by reaction with potassium iodide.

11. The method of producing 4-methoxy-4'-iodo-diphenyl sulfide which comprises coupling a para methyl ether of a thiophenate with para nitrochlorbenzene, reducing to the amine, diazotizing, and converting the diazonium compound to the iodide by reaction with potassium iodide.

12. The method of producing 4-hydroxy-4'-iodo-diphenyl sulfide which comprises coupling a para alkyl ether of a thiophenate with para nitrochlorbenzene, reducing to the amine, diazotizing, converting the diazonium compound to the iodide by reaction with potassium iodide, and dealkylating.

TREAT B. JOHNSON.